(12) United States Patent
David

(10) Patent No.: US 11,170,064 B2
(45) Date of Patent: Nov. 9, 2021

(54) METHOD AND SYSTEM TO FILTER OUT UNWANTED CONTENT FROM INCOMING SOCIAL MEDIA DATA

(71) Applicant: Corinne David, San Francisco, CA (US)

(72) Inventor: Corinne David, San Francisco, CA (US)

( * ) Notice: Subject to any disclaimer, the term of this patent is extended or adjusted under 35 U.S.C. 154(b) by 0 days.

(21) Appl. No.: 17/168,838

(22) Filed: Feb. 5, 2021

(65) Prior Publication Data

US 2021/0157872 A1    May 27, 2021

Related U.S. Application Data

(63) Continuation-in-part of application No. 16/786,225, filed on Feb. 10, 2020.
(Continued)

(51) Int. Cl.
*G06F 16/9535* (2019.01)
*G06F 40/279* (2020.01)
(Continued)

(52) U.S. Cl.
CPC ...... *G06F 16/9535* (2019.01); *G06F 16/9536* (2019.01); *G06F 40/279* (2020.01); *H04L 51/12* (2013.01); *H04L 51/32* (2013.01)

(58) Field of Classification Search
CPC ............. G06F 16/9535; G06F 16/9536; G06F 40/279; H04L 51/12; H04L 51/32
See application file for complete search history.

(56) References Cited

U.S. PATENT DOCUMENTS 5,946,673 A    8/1999    Francone
5,987,606 A    11/1999    Cirasole
(Continued)

FOREIGN PATENT DOCUMENTS

WO    WO 2014/151999 A1    9/2014
WO    WO2014151199 A1    9/2014

OTHER PUBLICATIONS

A. Berger, "A Maximum Entropy Approach to Natural Language Processing," Computational Linguistics, 1996, vol. 22, No. 1, New York, USA.
(Continued)

*Primary Examiner* — Etienne P Leroux
(74) *Attorney, Agent, or Firm* — Michael L. Greenberg, Esq.; Greenberg & Lieberman, LLC

(57) ABSTRACT

A method, system, and product for filtering out unwanted social media content in real-time. The system comprises multiple sets of machine learning classifiers to filter out the unwanted content on any media including but not limited to text, images, audio, and video. Classifiers are trained with labeled data. After being trained, the models screen the incoming real-time data either on a server or a mobile device. A user application is run that results in only approved content to be displayed on the main screen of the user application device. The unwanted data are still available if the user desires to access them. The classifiers are trained with labeled data; and with input parameters in addition to the labeled data. On the device, customized models are trained with the individual user data and Transfers Learning models. When unwanted content is detected, a report is sent to an entity that might help support the receiver.

2 Claims, 12 Drawing Sheets

Related U.S. Application Data

Figure 1:
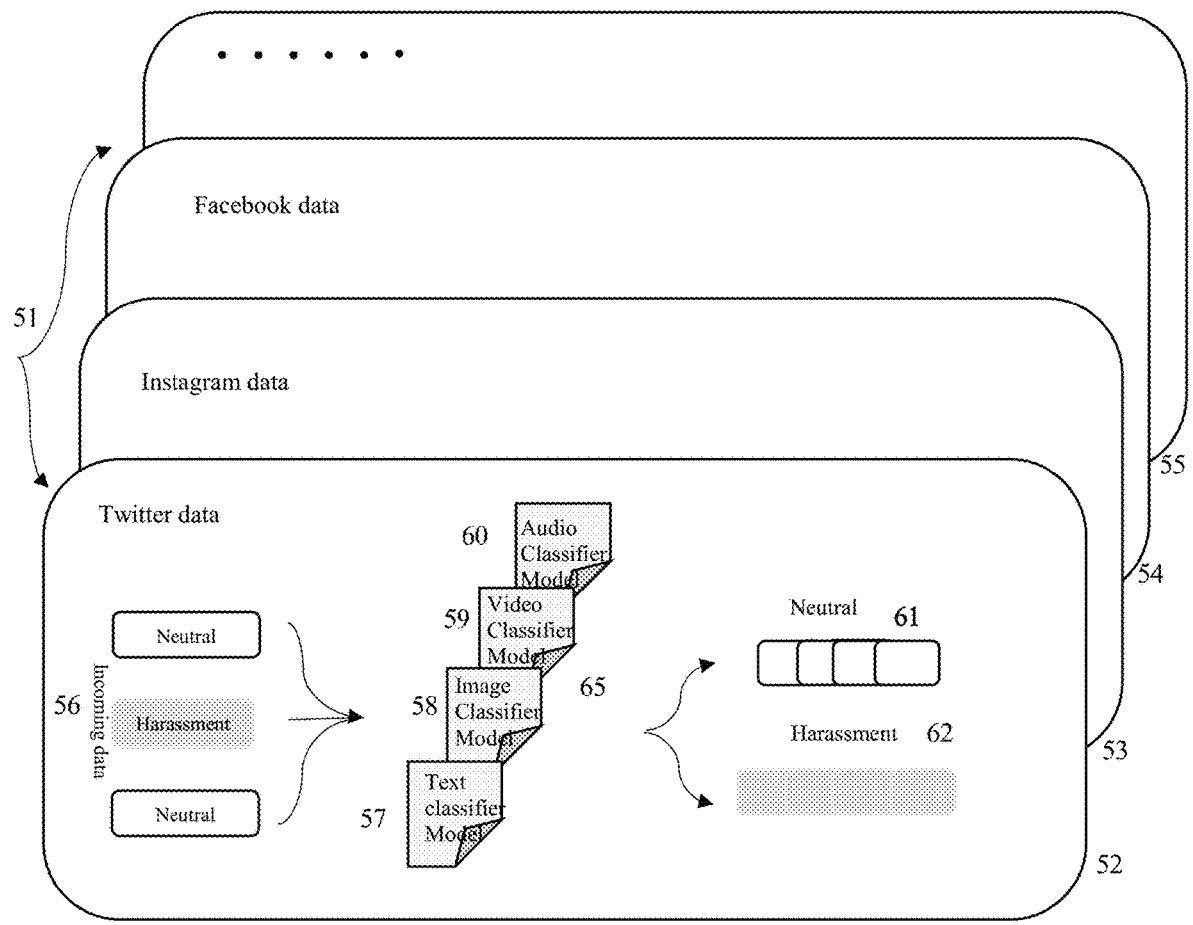

(60) Provisional application No. 62/813,752, filed on Mar. 5, 2019, provisional application No. 62/847,818, filed on May 14, 2019, provisional application No. 62/847,885, filed on May 14, 2019.

(51) Int. Cl.
*H04L 12/58* (2006.01)
*G06F 16/9536* (2019.01)

(56) References Cited

U.S. PATENT DOCUMENTS

| | | | |
|---|---|---|---|
| 6,308,175 B1 | 10/2001 | Lang | |
| 7,103,534 B2 | 9/2006 | Goodman | |
| 7,171,450 B2 | 1/2007 | Wallace | |
| 7,219,085 B2 | 5/2007 | Buck | |
| 7,496,628 B2 | 2/2009 | Arnold | |
| 8,224,950 B2 | 7/2012 | Humes | |
| 8,266,148 B2 | 9/2012 | Guha | |
| 8,386,401 B2 | 2/2013 | Virkar | |
| 8,504,504 B2 | 8/2013 | Liu | |
| 8,515,049 B2 | 8/2013 | Chavez | |
| 8,594,996 B2 | 11/2013 | Liang | |
| 8,656,463 B2 | 2/2014 | Callahan | |
| 8,762,298 B1 | 6/2014 | Ranjan | |
| 8,825,471 B2 | 9/2014 | Betz | |
| 8,838,633 B2 | 9/2014 | Dhillon | |
| 9,152,623 B2 | 10/2015 | Wroczynski | |
| 9,323,826 B2 | 4/2016 | Bailey | |
| 9,471,670 B2 | 10/2016 | Roseman | |
| 9,753,962 B2 | 9/2017 | Petschulat | |
| 10,031,977 B1 | 7/2018 | Maycock | |
| 10,097,511 B2 | 10/2018 | Sulivan | |
| 10,109,023 B2 | 10/2018 | Shah | |
| 10,229,203 B2 | 3/2019 | Li | |
| 10,235,639 B1 | 3/2019 | Mandel | |
| 10,388,272 B1 | 8/2019 | Thomson | |
| 10,574,600 B1* | 2/2020 | Chiarella | H04L 51/043 |
| 10,691,951 B1 | 6/2020 | Griesmer | |
| 10,679,011 B2 | 8/2020 | Galitsky | |
| 10,747,837 B2 | 8/2020 | Goldenstein | |
| 10,750,017 B2 | 8/2020 | St-Cyr | |
| 10,754,862 B2* | 8/2020 | Kraus | G06F 16/90324 |
| 10,757,058 B2 | 8/2020 | Baracaldo | |
| 10,853,897 B2 | 12/2020 | Williams | |
| 10,860,557 B2 | 12/2020 | Ebert | |
| 10,891,539 B1 | 1/2021 | Kearney | |
| 10,891,648 B1 | 1/2021 | Smith | |
| 10,896,214 B2 | 1/2021 | Kummamuru | |
| 10,896,421 B2 | 1/2021 | Adjoute | |
| 10,897,537 B1 | 1/2021 | Filbin | |
| 10,910,113 B1 | 2/2021 | Drouin | |
| 10,911,394 B2 | 2/2021 | Kramer | |
| 10,911,396 B2 | 2/2021 | Nair | |
| 10,911,814 B1 | 2/2021 | Mishra | |
| 2002/0010916 A1* | 1/2002 | Thong | H04N 5/278 725/1 |
| 2004/0122810 A1 | 6/2004 | Mayer | |
| 2006/0195583 A1* | 8/2006 | Bellifemine | H04N 21/6582 709/227 |
| 2006/0224673 A1* | 10/2006 | Stern | H04L 63/1491 709/206 |
| 2007/0204223 A1* | 8/2007 | Bartels | H04N 21/2543 715/210 |
| 2008/0071823 A1* | 3/2008 | Fellman | H04L 29/12594 |
| 2011/0145833 A1 | 6/2011 | De Los Reyes | |
| 2011/0252043 A1* | 10/2011 | Webb-Johnson | H04L 51/12 707/748 |
| 2012/0030293 A1 | 2/2012 | Bobotek | |
| 2012/0315918 A1* | 12/2012 | Kadous | H04W 64/00 455/456.1 |
| 2013/0212175 A1* | 8/2013 | Cheng | G06Q 50/01 709/204 |
| 2014/0181221 A1* | 6/2014 | Kushtagi | G06Q 10/107 709/206 |
| 2014/0257795 A1* | 9/2014 | Birnbaum | G06Q 30/02 704/9 |
| 2015/0081723 A1* | 3/2015 | Ogawa | G06F 17/30876 707/748 |
| 2015/0120583 A1 | 4/2015 | Zarrella | |
| 2015/0229531 A1* | 8/2015 | O'Sullivan | G06Q 50/01 709/223 |
| 2015/0254566 A1 | 9/2015 | Chandramouli | |
| 2016/0241447 A1* | 8/2016 | Liu | G06Q 30/02 |
| 2016/0255037 A1 | 9/2016 | Spivack | |
| 2017/0068736 A1* | 3/2017 | Beckley | H04W 4/21 |
| 2017/0110153 A1* | 4/2017 | Shynar | H04N 5/76 |
| 2017/0142044 A1* | 5/2017 | Ball | G06Q 50/01 |
| 2017/0308290 A1* | 10/2017 | Patel | G06F 3/04817 |
| 2017/0344530 A1* | 11/2017 | Krasadakis | G06F 40/47 |
| 2018/0046475 A1 | 2/2018 | Ran Wei | |
| 2018/0174064 A1* | 6/2018 | McQueen | H04L 63/1466 |
| 2018/0216946 A1 | 8/2018 | Gueye | |
| 2018/0225024 A1* | 8/2018 | Tsai | G06F 9/453 |
| 2018/0293978 A1* | 10/2018 | Sinha | G06N 7/005 |
| 2018/0356957 A1* | 12/2018 | Desjardins | G06F 40/279 |
| 2019/0019109 A1 | 1/2019 | Sadaghiani | |
| 2019/0138888 A1* | 5/2019 | Sekiyama | G06K 9/6217 |
| 2019/0149500 A1 | 6/2019 | Hodge | |
| 2019/0180245 A1 | 6/2019 | Weindling | |
| 2019/0213503 A1* | 7/2019 | Navratil | G06F 16/583 |
| 2019/0213601 A1* | 7/2019 | Hackman | G06N 3/084 |
| 2019/0372923 A1* | 12/2019 | Pasternack | G06F 40/263 |
| 2020/0019938 A1* | 1/2020 | Wang | G06N 3/0454 |
| 2020/0089779 A1* | 3/2020 | Debay | G06F 16/48 |
| 2020/0092192 A1* | 3/2020 | Ekambaram | H04L 67/12 |
| 2020/0104628 A1* | 4/2020 | Rajamohan | G06K 9/6273 |
| 2020/0142962 A1* | 5/2020 | Lin | G06F 40/253 |
| 2020/0275166 A1* | 8/2020 | Jordan | H04L 9/3239 |
| 2021/0029207 A1 | 1/2021 | Crocker | |

OTHER PUBLICATIONS

B. Chesney, "Deep Fakes: A Looming Challenge for Privacy, Democracy, and National Security," 2018, California Law Review, USA.

T. Davidson, "Automated hate speech detection and the problem of offensive language," 2017, in Proc. of ICWSM, New York, USA.

L. Engman, "Automatic Detection of Cyberbullying on Social Media," 2016, Ume a University Sweden.

A Founta, "A Unified Deep Learning Architecture for Abuse Detection", 2018, Alabama, USA.

S. Hershey, "CNN Architecture for Large Scale Audio classification," International Conference on Acoustics, Speech and Signal Processing, IEEE, 2017, New Orleans, USA.

J. Golbeck, "A large labeled corpus for online harassment research," In Proc. of ACM, 2017, University of Maryland, USA.

R. Kohavi "Glossary of terms, Machine Learning," 1998, vol. 30, Nos. 2-3, pp. 271-274.

Hao Li, "Image Analysis of cyberbully using Machine Learning techniques," Master Thesis, 2016, Pennsylvania, USA.

J.M. Xu, "Learning from bullying traces in social media," in HLT-NAACL, The Association for Computational Linguistics, 2012, pp. 656-666, Madison, USA.

H. Zhong, "Content-driven detection of cyberbullying on the Instagram social network," 2016, IJCAI AAAI, pp. 3952-3958, Pennsylvania, USA.

N. Lipka, "Modeling Non-Standard Text Classification Tasks," Doctoral Thesis 2013 Dr. rer. nat. Germany.

J. Nam, "A deep bag-of-features model for music auto-tagging," IEEE, 2016, Seoul, Korea.

K. Nigam, "Using maximum entropy for text classification," in IJCAI-99 workshop on machine learning for information filtering 1 (1), 61-67, 1999, Stockholm, Sweden.

Quanzeng You, "Visual Sentiment Analysis by Attending on Local Image Regions," in Proc. 31st AAAI Conf. Artif. Intell., 2017, pp. 231-237, New York, USA.

(56) References Cited

OTHER PUBLICATIONS

K. Simonyan, "Deep Convolutional Networks for Large-Scale Image Recognition" International Conference on Learning Representations, 2015, San Diego, USA.
C. K. Themeli, "Hate Speech Detection using different text representations in online user comments", MSc Thesis, 2018, Athens, Grece.
C. Sapp, "Preparing and Architecting for Machine Learning", Gartner Professional advice, 2017, Stamford, USA.
Z. Waseem, "Hateful symbols or hateful people? predictive features for hate speech detection on Twitter," in Proc. of the NAACL 2016, Copenhagen, Denmark.
Z. Waseem, "Understanding Abuse: A Typology of Abusive Language Detection Subtasks," 2017, arXiv preprint arXiv:1705.09899.
M Wiegand, "Inducing a Lexicon of Abusive Words—A Feature-Based Approach", Proceedings of NAACL-HLT 2018, pp. 1046-1056, New Orleans, USA.

* cited by examiner

METHOD AND SYSTEM TO FILTER OUT UNWANTED CONTENT FROM INCOMING SOCIAL MEDIA DATA

1 SUMMARY

Social media users increasingly complain of harassment through the receipt of unwanted content. Some users no longer feel safe expressing themselves on social media as a result of being subjected to such content. It is unrealistic to expect that people refrain from social media use to avoid such harassment. Social media use has become a necessity in our economic and social lives. Therefore, the need exists to filter out unwanted content, thereby creating a safer social media environment. Social media companies have been loath to police content on the sender side. Abusive senders have been removed from social media platforms but not with an automated system. Removal, a rare occurrence, is subject to individual human evaluations. Moreover, such interventions take place after the fact.

The disclosed method and system offer a solution at the point where data are received. The system filters any media including but not limited to text, images, audio, and video. Incoming data is filtered through a classifier. A set of trained Machine Learning (ML) classifier models separate unwanted content and assign it to a separate set. Only acceptable content is displayed on the main screen but the user retains the ability to access the filtered out material. The acceptable content comprises any neutral content including but not limited to positive and neutral. Reporting of the harassment is automated, obviating the need for the user to take affirmative steps for each instance of harassment. The main benefits of the system are: first, to filter out any unwanted content comprising but not limited to harassment, threat, abuse, sexual aggression, religious aggression, fake news, and fake videos prior to viewing by recipients; second to automate reporting. The term harassment comprises threats, abuse, sexual, religious, and gender aggressions.

2 CROSS-REFERENCE

This application claims the benefit of and priority under 35 U.S.C. § 119(e) to U.S. Patent Application No. 62/813,752, filed on Mar. 5, 2019, entitled, "System to filter out harassment on social media on the receiver side," which is incorporated herein by reference in its entirety.

This application claims the benefit of and priority under 35 U.S.C. § 119(e) to U.S. Patent Application No. 62/847,818, filed May 15, 2019, entitled "System filters out harassment from incoming social media data," which is incorporated herein by reference in its entirety.

This application claims the benefit of and priority under 35 U.S.C. § 119(e) to U.S. Patent Application No. 62/847,885, filed May 15, 2019, entitled "System to filter out harassment on social media on the receiver side," which is incorporated herein by reference in its entirety.

This application claims the benefit of and priority under 35 U.S.C. § 119(e) to U.S. patent application Ser. No. 16/786,225, filed Feb. 10, 2020, entitled "Method and system to filter out harassment from incoming social media data," which is incorporated herein by reference in its entirety.

3 BACKGROUND AND PRIOR ART

In a Jan. 19, 2019 interview, Jack Dorsey, one of the founders and the Chief Executive Officer of Twitter revealed how surprised he and his colleagues were at the prevalence of social media harassment: "We weren't expecting any of the abuse and harassment, and the ways that people have weaponized the platform." Dorsey explained that they felt "responsible about it." See Appendix, p.1.

Social media companies allow users to report abuse and require verification by e-mail addresses, phone numbers, or the identification of pictures to prevent robotic contact attempts. But these mechanisms have proven fruitless to stop harassment. Improvements in ML technology, however, provide an opportunity to counter harassment.

ML algorithms are used to train known labeled data for predicting the label of unlabeled data. This computational process is called a "classifier." Classifiers can be applied to text, images, audio, and video. In the 1990s, a variety of text classification techniques started to demonstrate reasonable performance (Nigam et al., 1999).

Text classifiers have become more accurate. News providers have taken the lead in protecting conversations with their readers or viewers from bad actors by using machine learning technology to approve comments for publication on their websites. The Times, an English newspaper, for instance, partnered in 2016 with a Google-owned technology incubator to score incoming comments by comparing them to more than 16 million labeled Times comments going back to 2007. Bassey Etim, "The Times Sharply Increases Articles Open for Comments, Using Google's Technology," New York Times, Jun. 13, 2017. See Appendix, p.16.

U.S. Ser. No. 10/031,977 issued on Jul. 24, 2018, to Maycock, describes a solution to the problem of harassment on social media. Maycock's patent solves the issue by filtering the data at the operating system level of the user device. But accessing the operating system (called "jailbreaking") may violate user licensing agreements and the law. (See 17 U.S.C. § 1201). The disclosed system proposes to resolve the issue at a higher level without need to access the operating system. Instead, to access data, an inter-process technology communication system is used including but not limited to an Application Programming Interface (API), Representational State Transfer Rest (Rest API), and Webhook.

4 SHORT DESCRIPTION OF DRAWINGS

FIG. 1—Classifiers filter out harassment from incoming data from different platforms.

Figure 2:
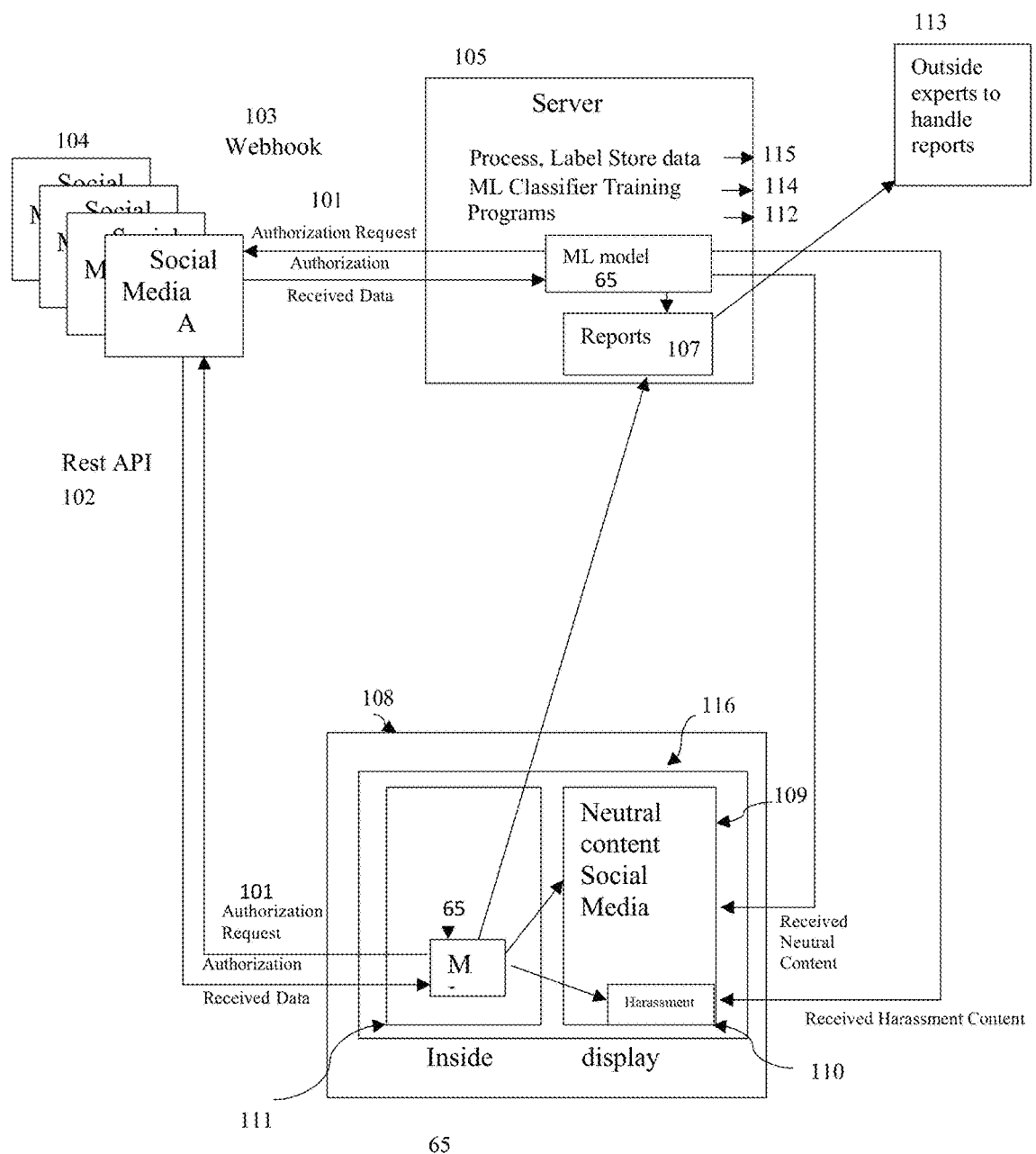

FIG. 2—System receiver side.

Figure 3:
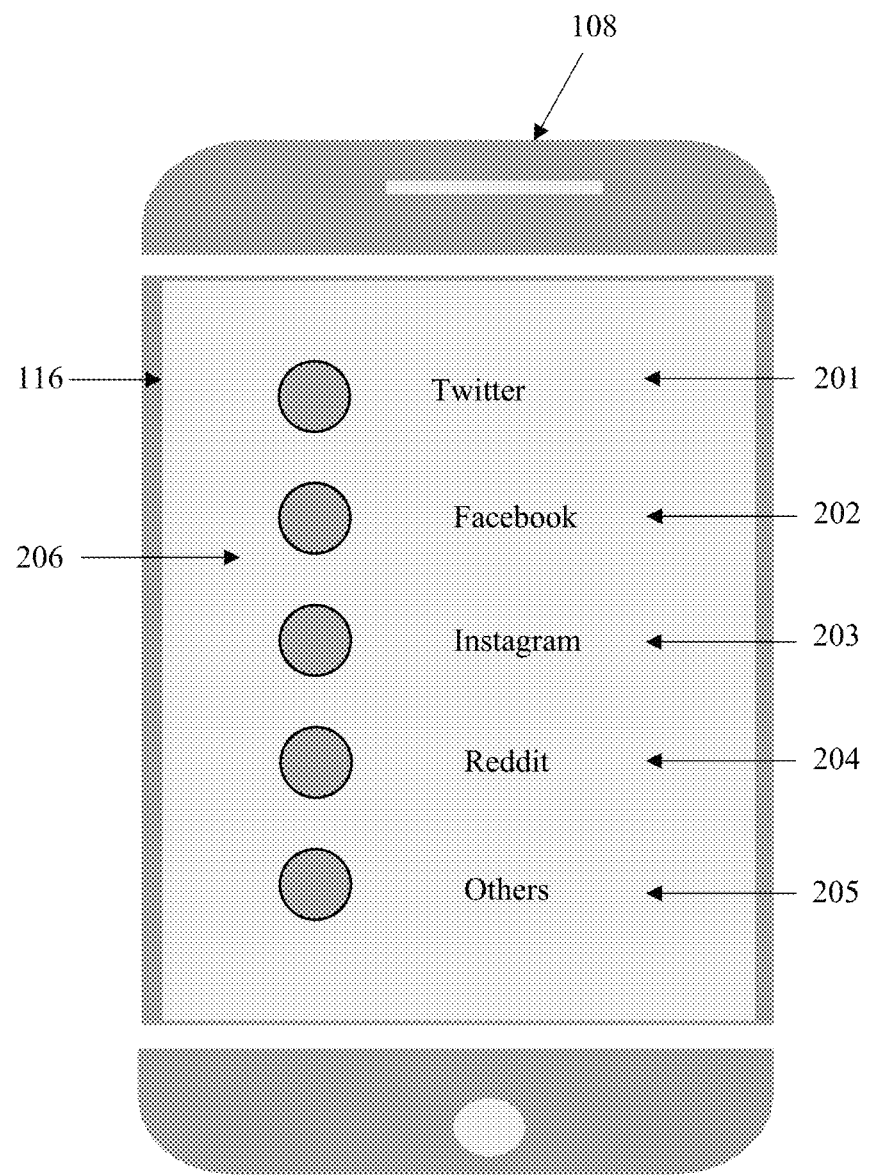

FIG. 3—Portal to access the different social media platform data.

Figure 4:
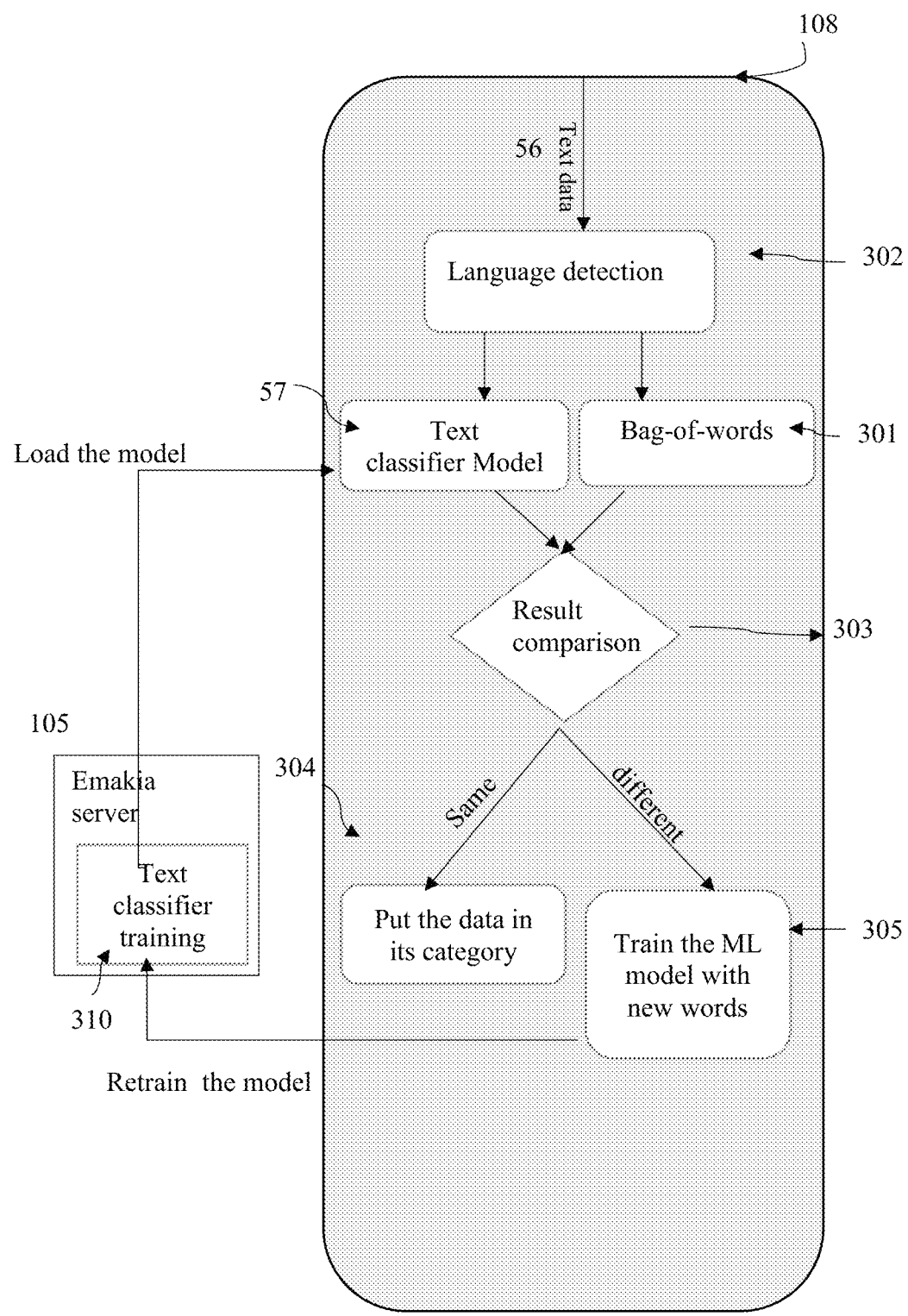

FIG. 4—Algorithm for filtering out harassment on text.

Figure 5:
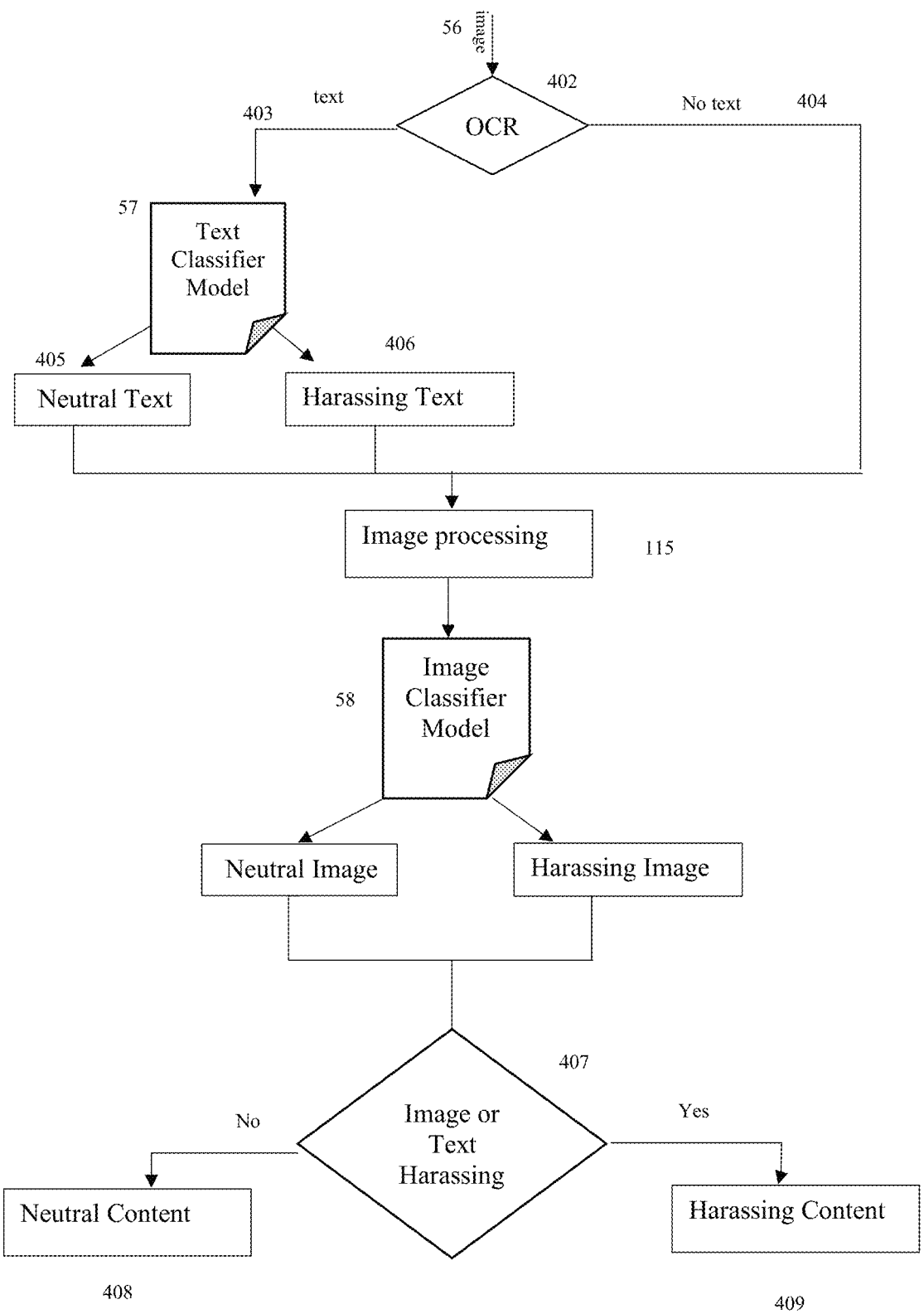

FIG. 5—Algorithm to find the text on an image to filter out harassment.

Figure 6:
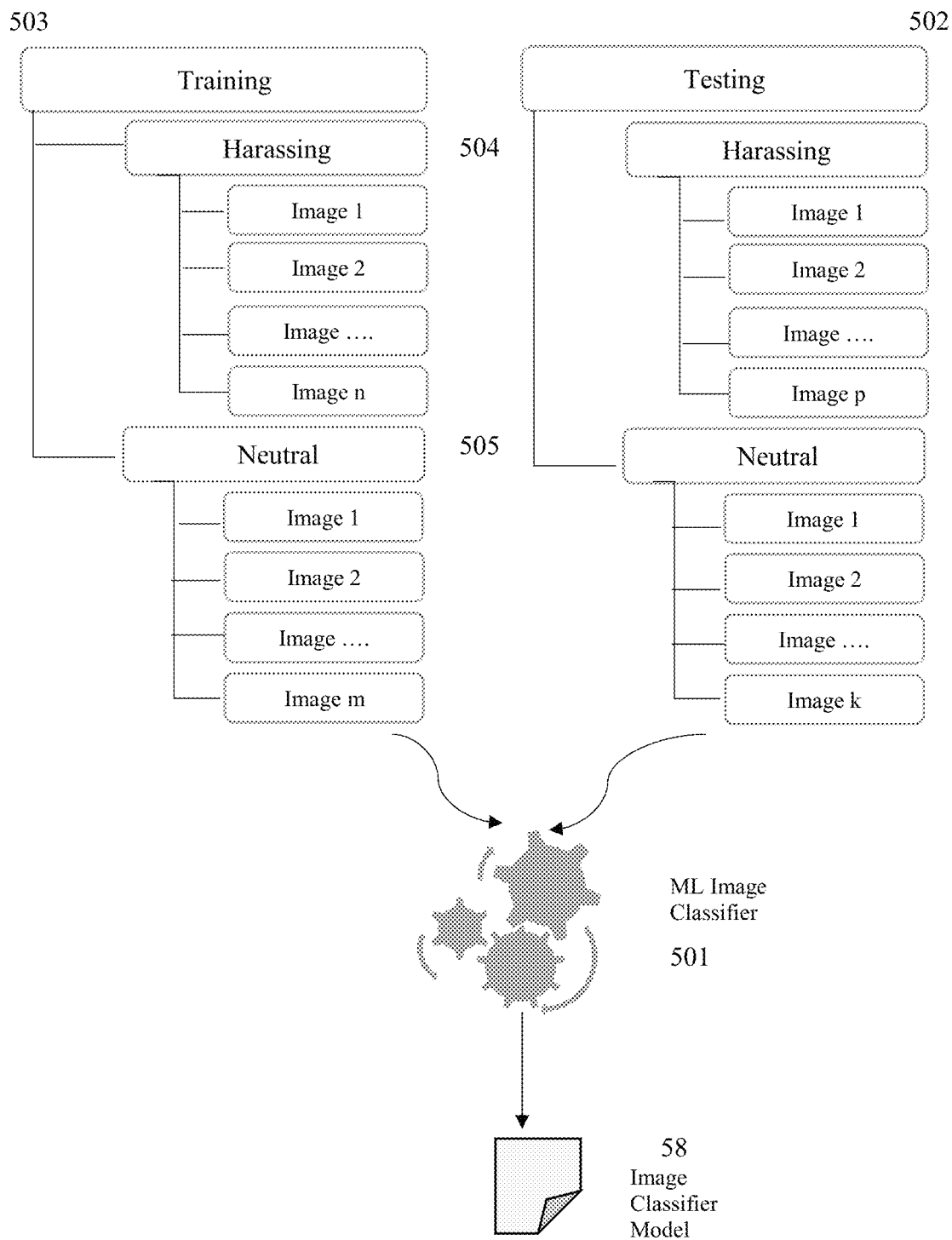

FIG. 6—Folder structure to enter data into the ML classifiers.

Figure 7:
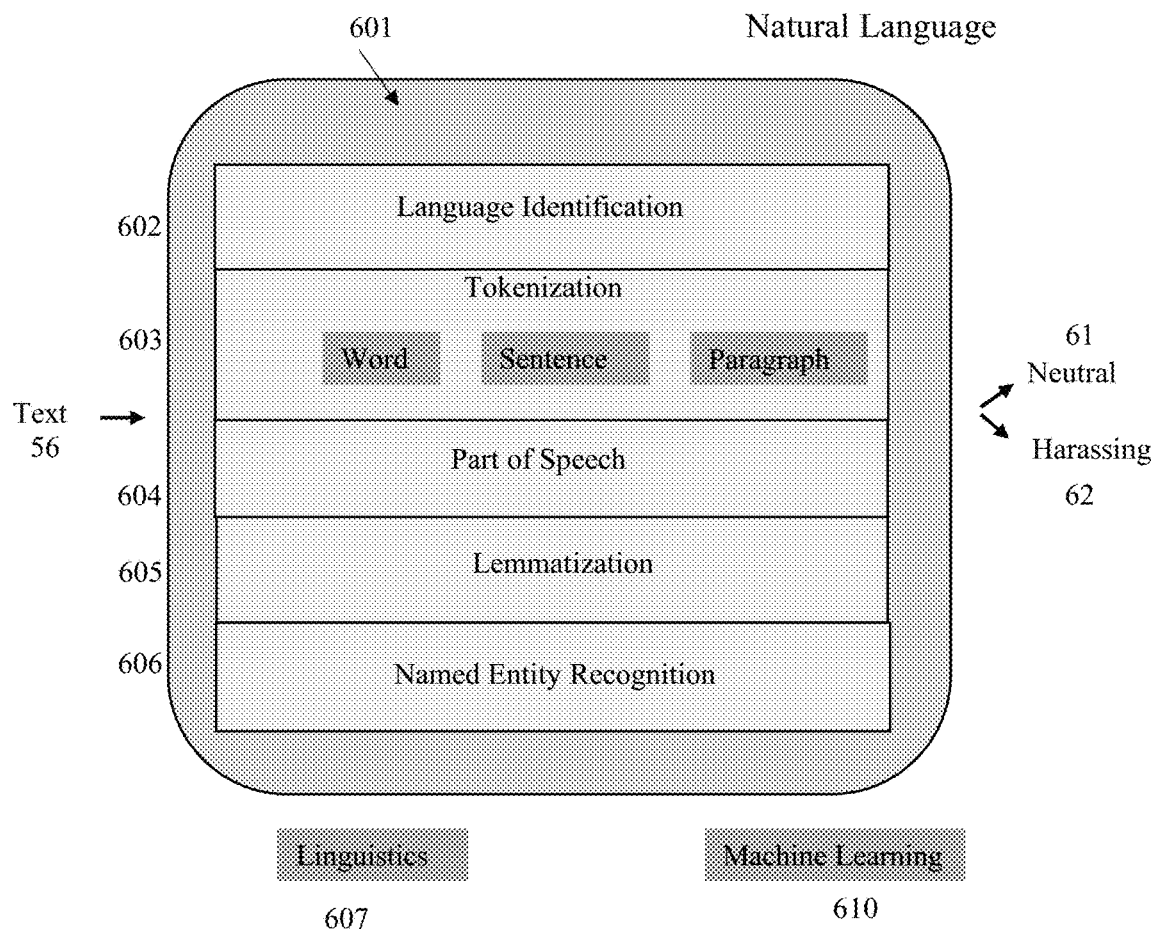

FIG. 7—Tools for extracting features from text, natural language, and machine learning.

Figure 8:
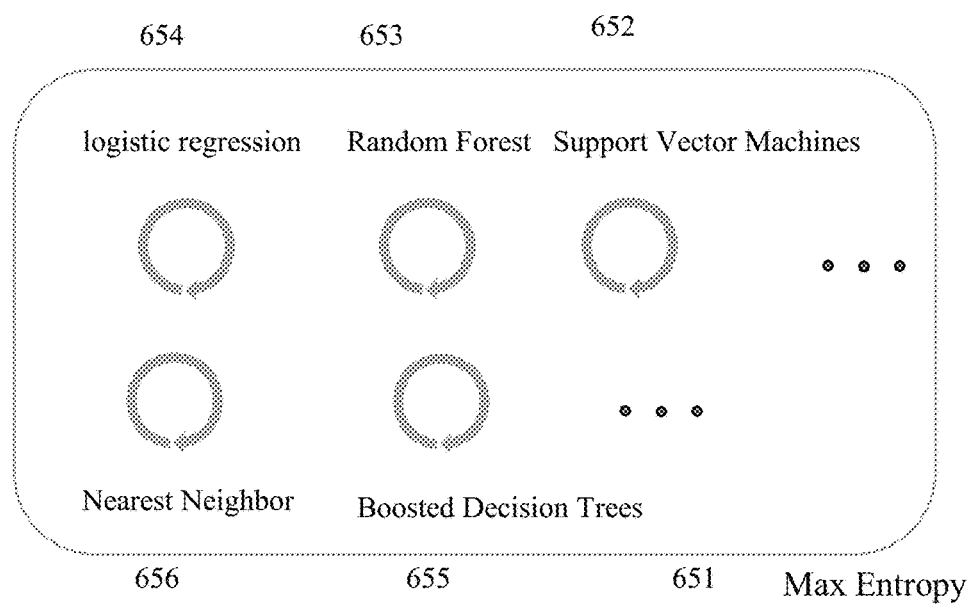

FIG. 8—Max Entropy with different algorithms to run.

Figure 9:
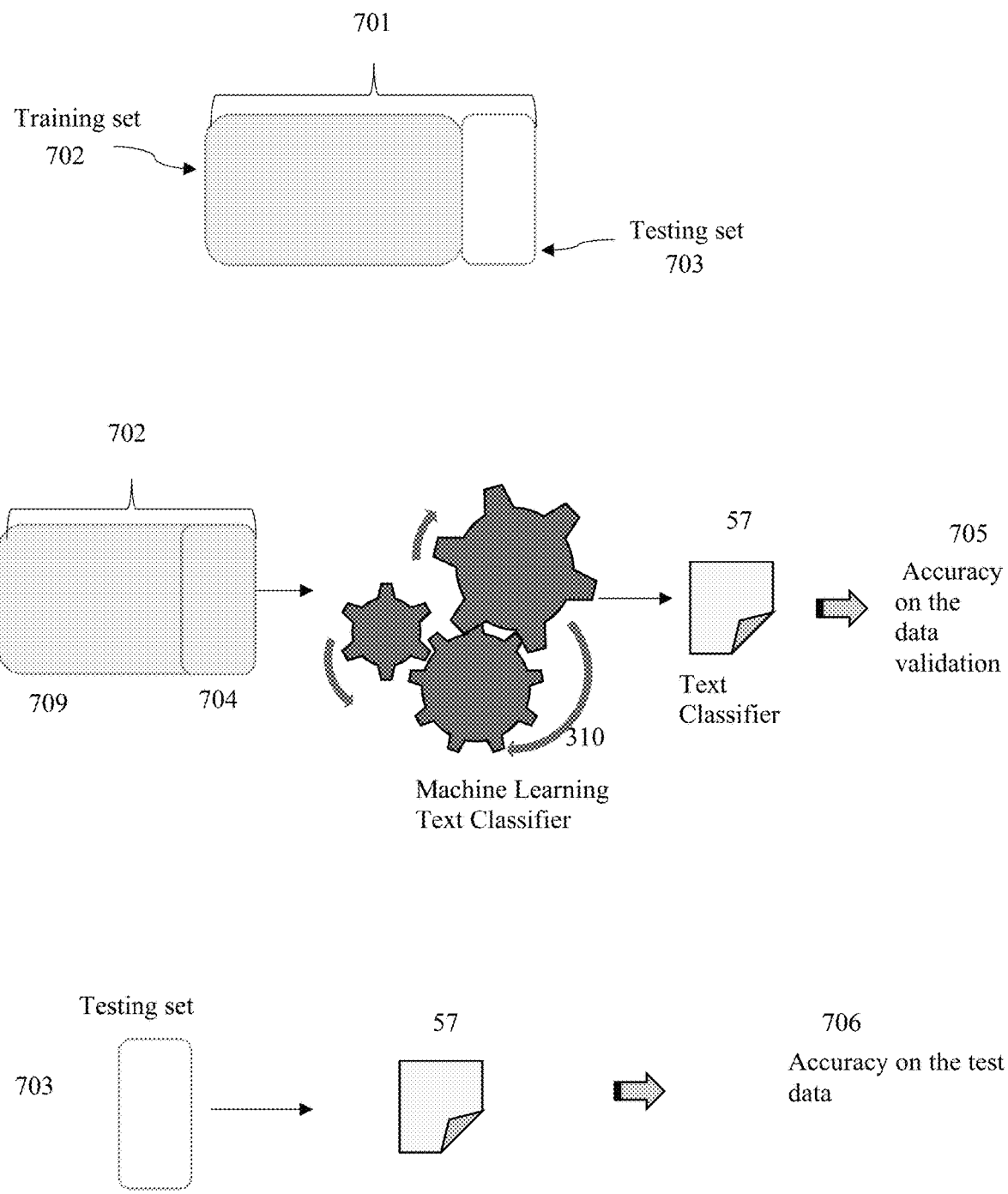

FIG. 9—Training and test data to train and test ML classifier to create a model.

Figure 10:
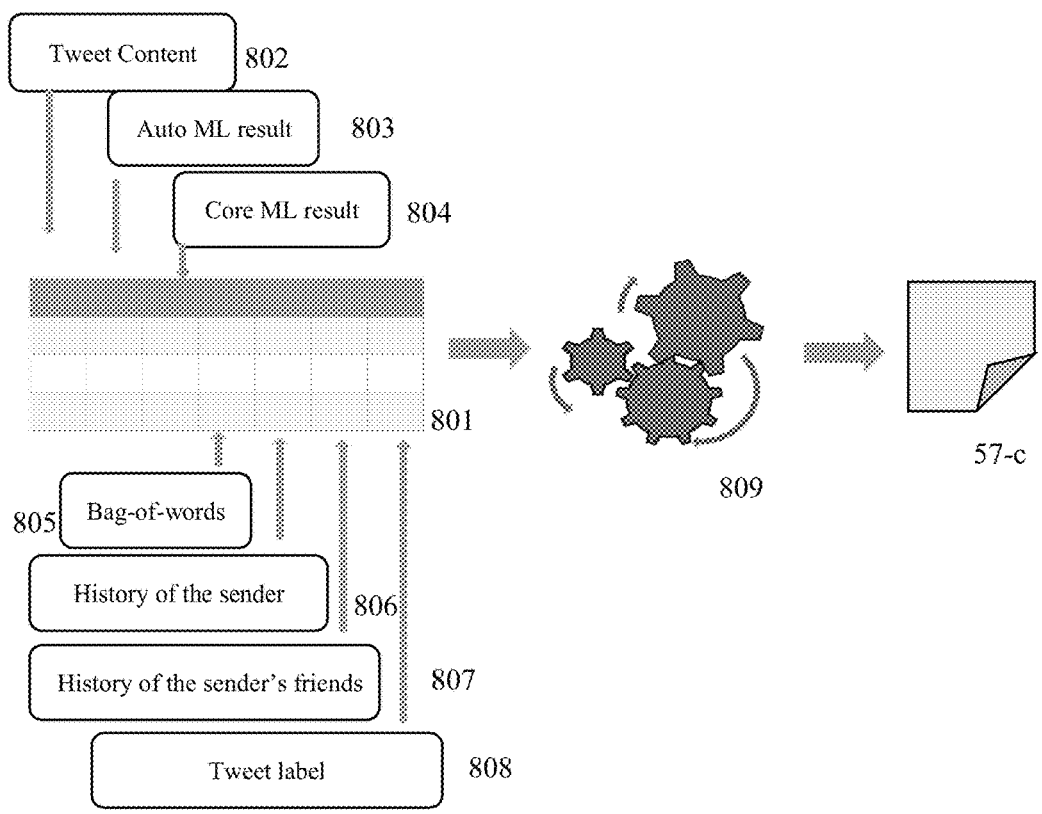
Figure 10:
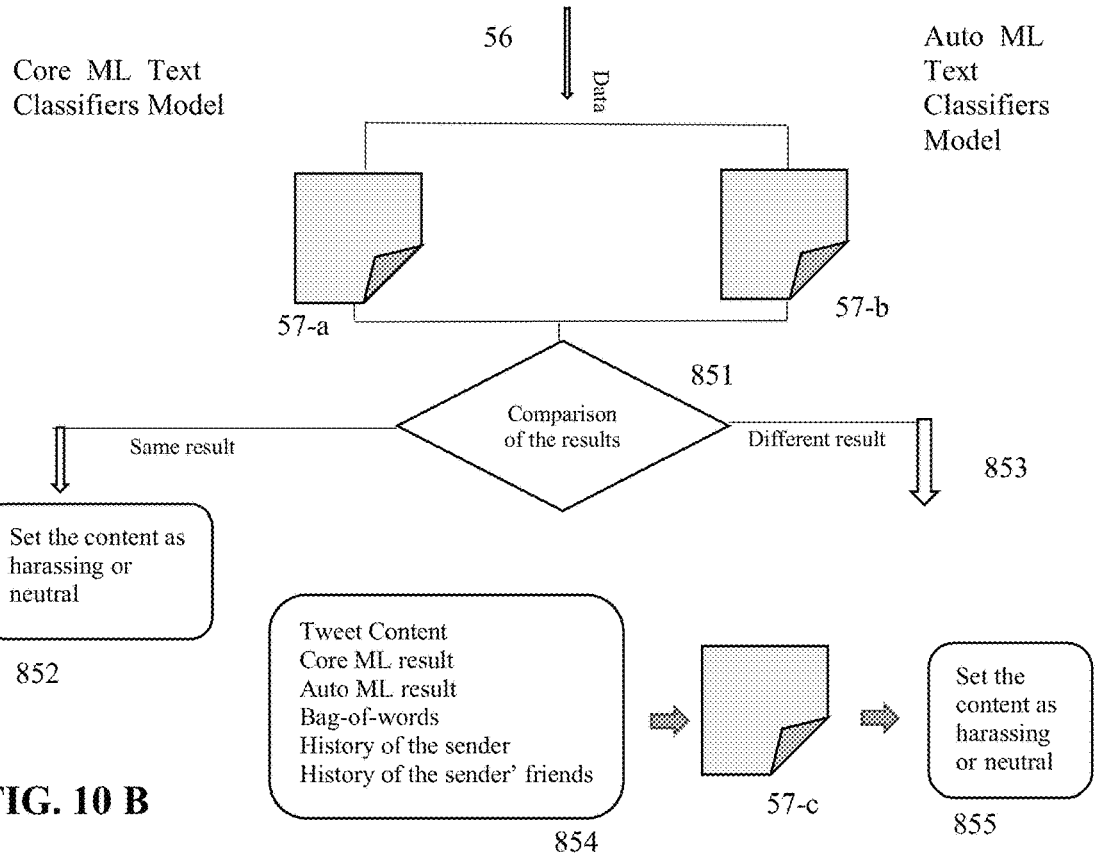

FIG. 10A—Text Classifier training with parameters.

FIG. 10B—Improving the results by comparing the Core ML and Auto ML classifiers.

Figure 11:
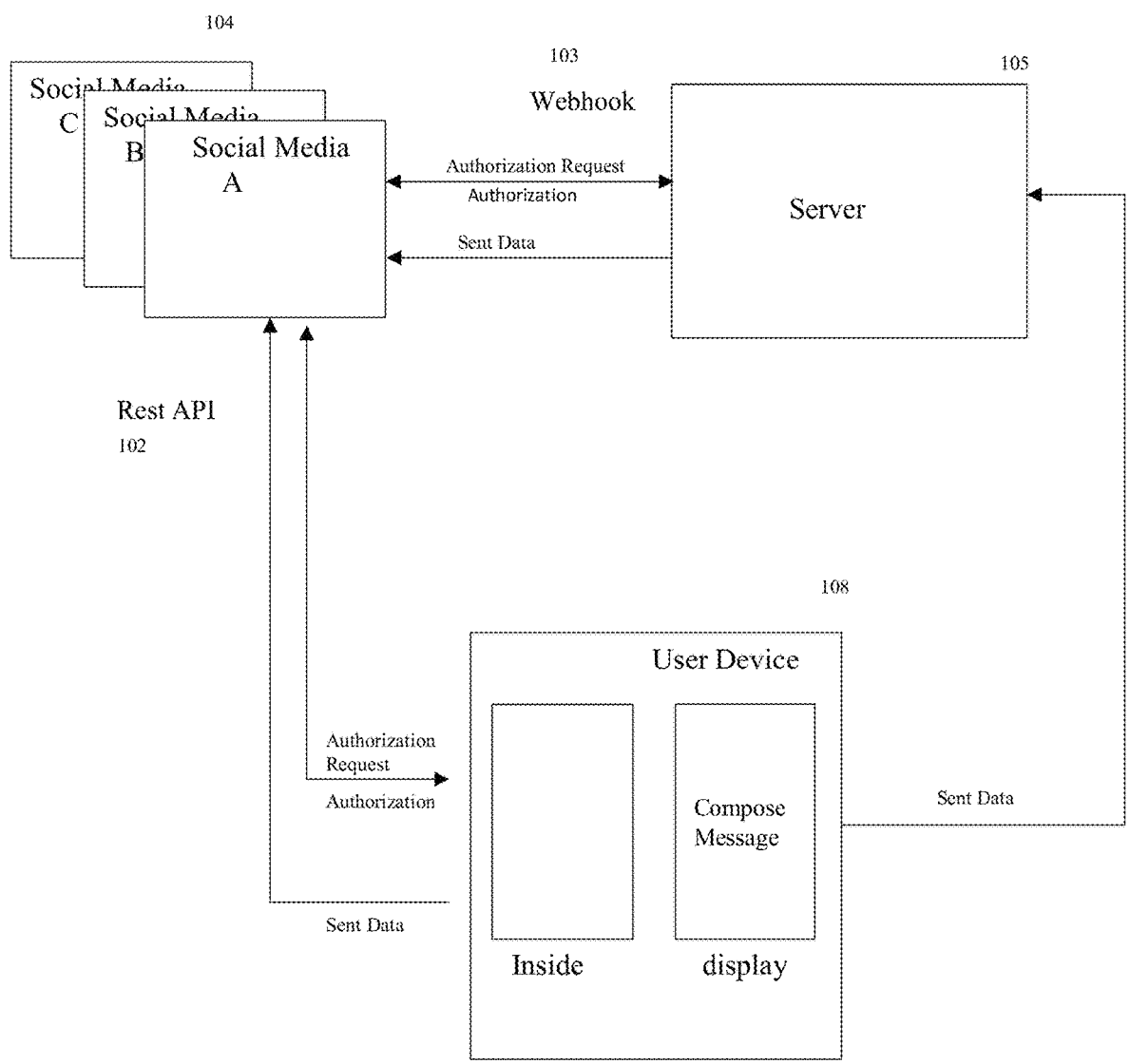

FIG. 11—System sender side.

Figure 12:
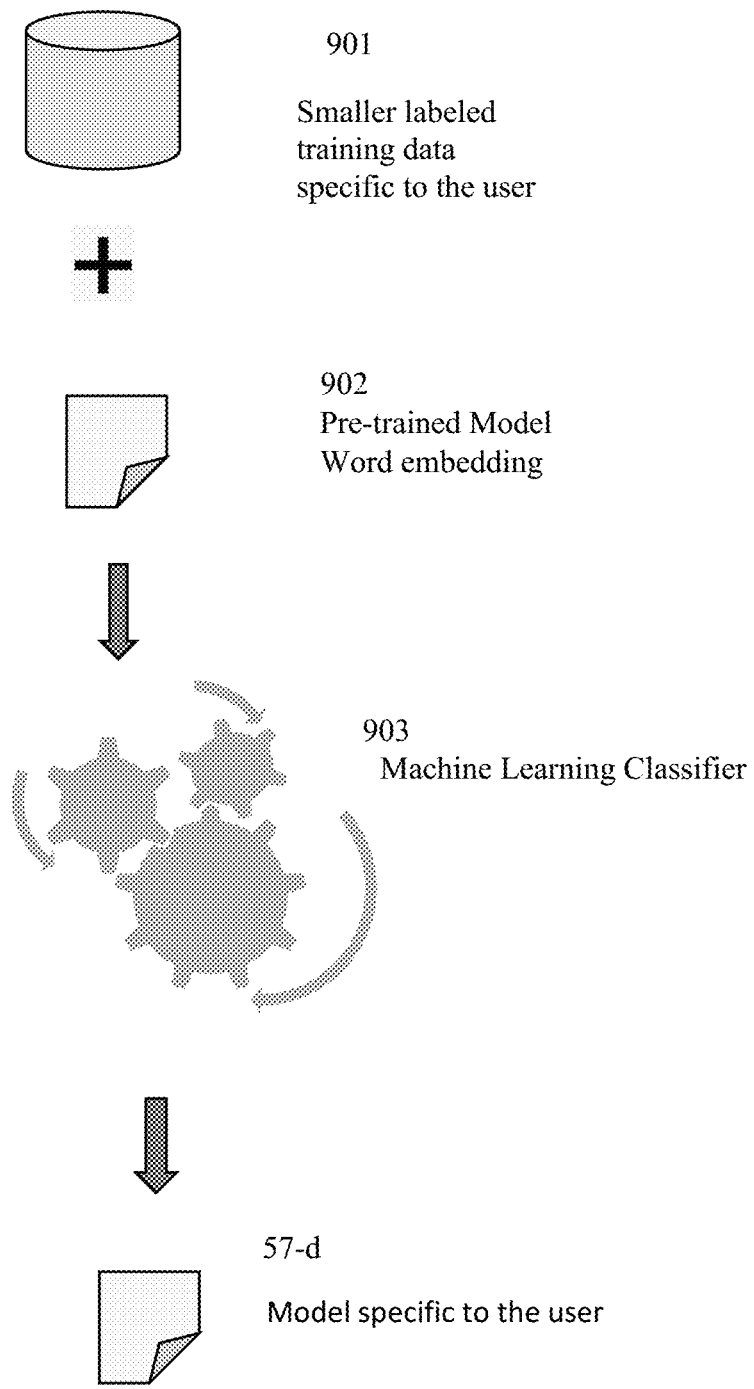

FIG. 12—Process of customization of the ML models.

Figure 13:
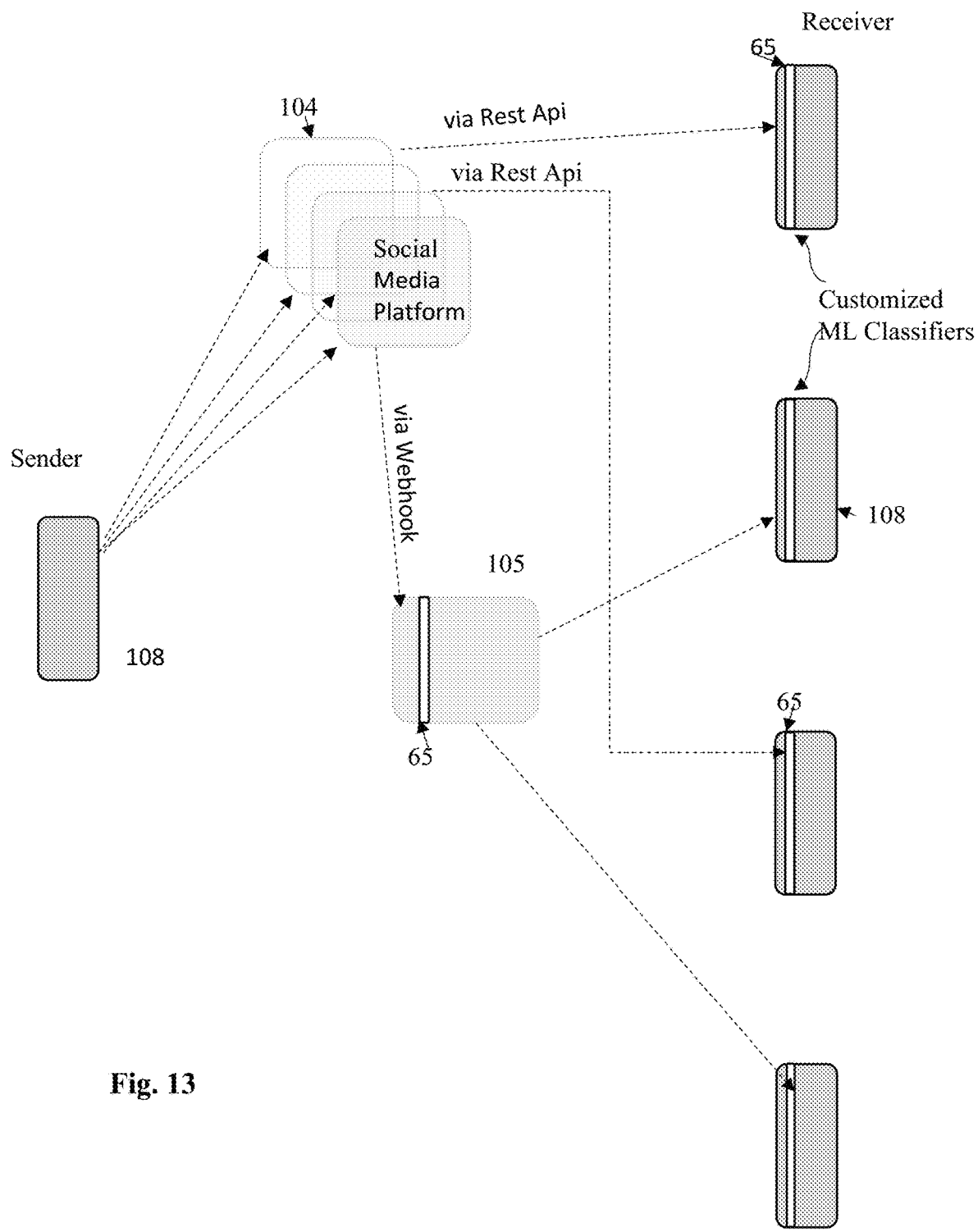

FIG. 13—Overview of data filtered with a customized ML model.

5 DETAIL DESCRIPTION OF THE INVENTION

The method, system, and product comprise several components: Receiver Side, Rest API, Webhook, a user application running on devices, data collection, training, evaluation and deployment of ML models on the user device, reports, and any additional programs to process and validate the data and the labeling.

FIG. 1 describes the incoming data 56, which are in text, image, video, and audio format. The data from any social media platforms 52, 53, 54, 55 are processed to solve the harassing issue on social media. We apply a set 65 of ML classifier models 57, 58, 59, 60 on the incoming content 56. Any classifier models comprising Apple Core ML, Google Auto ML, or AWS ML determine if the incoming data 56 is harassing. The classifier models separate the data into sets comprising the harassment data set 62 and the neutral data set 61. Only the neutral data are displayed to the receiver's main screen; the harassing content is filtered out. The classification process is similar to the ML classifiers used to filter out spam from emails. See Appendix, p.18. The system uses any classifier including but not limited to the Apple Core ML classifier to create classifier models for the iPhone. See Appendix, p.20. For Android phones, the system uses but is not limited to AutoML provided by Google.

ML classifiers process incoming image, audio, and video data to detect unwanted content. Also, an additional text classifier is trained with fake news data in order to detect incoming fake news. The results of all the classifiers are combined to finalize the result. The incoming data from each platform are processed with a set of classifiers that were previously trained with its own labeled data to create a data-specific model.

5.1 System—Incoming Data (FIG. 2)

FIG. 2 describes how the system processes the incoming data 56 and how the data is transferred. ML classifier models 57, 58, 59, 60 are applied to the incoming data either on the device 108 or on the server 105 in order to filter out unwanted content. The results from the classifiers are analyzed to make the final decision.

5.1.a Data Transfer

Social media platforms transfer the content of user data to a third party via an API that provides access that could be Rest API or Webhook depending on their own internal social media platform rules. The data are routed via two different paths, one path directly from social media platforms to the user device via Rest API 102 and the other from the social media platform to the server 105 and then to the user device 108 via Webhook 103. The data are usually delivered in JSON format.

Authorization Request (101)

Social media platforms 104 provide access to user data to third parties when the users input their username and password. The system does not have access to the latter two. The user runs the user application 116 to seek an authorization request 101 from the social media platform 104 to allow the application to access the user's data. The social media platform provides a token to allow for continuous access. By saving the session, the user is able to re-enter the application without having to log in again.

Rest API (102)

The function of the Rest API is to pull the data. It provides a communication protocol between the user's device 108 and the social media platforms. After authorization is granted, the protocol allows the user to request and receive data. The social media platform 104 transfers the data directly to the application 116 via Rest API 102.

Webhook (103)

The function of the Webhook is to push the data to the server. Webhook 103 is typically used to transfer large amounts of data. No request for data is required. The social media platform sends data when it becomes available. The use of Webhook 103 requires registration of a Unified Resource Location (URL) through a domain service provider. The URL becomes the endpoint where the data are received on the server 105.

Whenever there is new content for the user, the social media platform 104 sends the data via Webhook to the end-point on the server. The server listens for user content at the end-point.

5.1.b Server (105)

The system hardware needs to be expandable to accommodate increasing numbers of users and development growth. The different ML classifiers require the system to have high processing power. Platforms that provide high Central Processing Units (CPUs) usage and memory that are expandable comprise Google Cloud, AWS Amazon, and like. The server processes, labels, and stores labeled data in any media and in multiple languages 115; trains, retrains, and validates different sets of ML classifiers for each language and each data type 114; and runs additional programs 112. These programs 112 collect harassment data; process text, images, audio, and video; and create reports of the harassment or fake news. The programs 112 will integrate additional functionalities. The system runs on several cloud servers across different geographic regions.

The data are in English and Italian, and the text classifier models are trained with English labeled content and Italian labeled content. In future versions, the system will process additional languages and emoji.

Program Collecting Harassing Data (112)

Different in-house programs run on the server. One such program collects harassing tweets from Twitter to increase the size of the data set used to train the Text Classifier model. The program uses the standard search Twitter API to obtain specific harassing terms that are new to the labeled data set. The URL "https://api.twitter.com/1.1/search/tweets.json" is one of the many search APIs. The specific hashtag searches return a series of tweets containing harassing terms. Those tweets are labeled and added to the existing set. The program also allows searches for specific Twitter users to train the model to be exposed to different styles of writing. For instance, the program searched for former President Obama's tweets. After validating their content, those tweets were added to the labeled neutral data set for purposes of training. Later, the model was tested with Michelle Obama's tweets.

5.1.c User Application (116)

FIG. 2 shows the user application 116 running on any user device comprising iPhone, iPad, Android, Samsung, and Window mobile 108. The data is received via any inter-process communication technology including but not limited to Rest API or Webhook. The application runs the processes 111, compromising the classifier models 65 that filter unwanted content in real-time on the incoming data; the other component 109 represents what is displayed on the device.

Unwanted content is separated but can still be accessed with any clickable or sliding area including but not limited to the TabBar icon 110 at the bottom of the display. The user can modify the labeling if the user considers the separated content as not harassing. Vice versa, neutral content can be labeled as harassing by sliding the content on the screen and moving it to a different category. The modifications made by the user are sent to the server to retrain the Model with the individual user preferences. The ML model will be trained or retrained with data based on what users define to be harassment or not. When the harassment content is detected, a report 107 is sent for further proceedings on solving the harassment issue.

FIG. 3 shows an application Graphic User Interface (GUI) 206, a portal to access any social media platforms comprising Twitter 201, Facebook 202, Instagram 203, Reddit 204, and others 205. The portal allows users to navigate from one social media platform to another in order to access their user data from that platform without being subjected to unwanted content. FIG. 3 shows radio buttons; however, any GUI with functionality including but not limited to sliding or clicking such as a TabBar could be used instead of a radio button to access the social media data.

5.1.d ML Classifiers (65)

ML classifiers 57, 58, 59, 60 are trained on the server and run either on the server 105 or the user device 108.

Text Classifier Model to detect Harassment (57)

FIG. 4 describes how the bag-of-words 301 acts as an adaptive filter to reduce text classifier inaccuracy. The system trains text classifiers including but not limited to the Apple Core ML, Google AutoML, AWS ML, Windows ML, and Python ML. The trained model, when used with real-time data, is initially not 100% accurate. The accuracy of the model is then improved by increasing the size of the labeled data set by collecting more labeled data from different sources. To increase detection accuracy and to collect more data for retraining the model, the system uses a filter which is called a bag-of-words. The bag-of-words acts as an adaptive filter by catching content as yet unknown to the model. Afterward, the model is retrained with the unknown content that has been classified by the bag-of-words filter as harassment. The bag-of-words is subdivided into five sets, a number that can be increased. The first set is hardcore harassing terms. The second set has words evincing a milder harassing tone. The third set has terms that have a double meaning, with one of the meanings being harassing. The fourth set contains phrases connecting the sub-list of "bad actions" with the sub-list of the intended recipient of those bad actions and the fifth set contains emojis. The number of sets might increase with the data needs. Content defined as harassing has at least one word from the first, fourth, or fifth set. The neutral content, however, may include words from the set with moderate words (e.g., the word "stupid") and/or the set with double meaning terms.

Language detection 302 determines the language of the data. Then, a corresponding text classifier 57 is loaded to process the incoming data 56. The classifier labels the incoming content as harassing or neutral. In parallel, the data go through the bag-of-words filter 301. While the bag-of-words can aid to detect explicit abuse, it is used most effectively in reinforcing the model to be more accurate by detecting the unknown terms with which to retrain the model.

Results from the model and the bag-of-words filter are compared 303. If the model and filter results are the same, then the data are placed in the corresponding category 304. If the results differ 305, the decision of the filter overrides the one by the model. The discrepancy between model and filter results is reported to the server for analysis. On the server 105, the data collected with the correct label is used to retrain the model 310.

To reduce the size of the bag of words we use multiple approaches comprising a set of NLP algorithms such as stemming and lemmatizing to reduce the inflectional forms of each word into a common base or root and a look-up table for words and phrases. Any lookup table that compresses data comprising Gazetteer from Apple is used.

Image Classifier Model (58)

The system, in addition to detecting harassment in text, also detects harassment on image content. Some images contain text; others do not. If the image contains a text, the system detects the text. FIG. 5 describes how to capture harassment on the text content of images 56, by applying an Optical Characters Recognition (OCR) 402 to perform text detection on the image. Once captured 403, the text is passed through the ML text classifier model 57 to detect harassment. If harassment is detected in text 406, then the label for text content is set to harassing. If the text does not have harassing content the label for the text is set as neutral 405. After labeling the text, the system applies a set of processes 115 on the image to extract its features: color histogram; texture; edge-direction coherence vector, Fast Fourier Transform (FFT), face detection, and object detection, among others. The extracted features are entered as the parameter of the training of the model. The model is then run against the image data, a process that will result in the categorization of image content as harassing or neutral. The Apple Vision framework works with Core ML by applying classification models to images and preprocessing those images to make machine learning tasks easier and more reliable. See Appendix, p.20. The open-source MobileNet model, one of several available classification models, identifies an image using 1000 classification categories. Another available model is Visual Geometry Group (VGG), a convolutional neural network model proposed by K. Zisserman from the University of Oxford in the paper, "Very Deep Convolutional Networks for Large-Scale Image Recognition." The VGG model achieves 92.7% top-5 test accuracy in ImageNet, which is a dataset of over 14 million images divided into 1000 classes.

Then, the image is run through the image classifier model 58 to determine if the image is harassing or not. Which image classifier is used depends on the operating system of the user device (Core ML with Apple Vision framework for Apple; AutoML Vision for Google; Windows ML for Windows). Multiple Python ML vision libraries (including but not limited to TensorFlow and Keras image classifiers) train models that run on any operating system.

Final decision 407 is if either the image or the text is harassing, then the tweet content is labeled as harassment 409; otherwise, it is labeled as neutral 408.

In FIG. 6, ML Image Classifiers 501 is trained with an input of data 56 comprising of images that need to be categorized before the classifier can learn to recognize the images. The categorization is done by naming folders. A data source provides training or testing data to an ML image classifier 501. The data are organized on disk to be compatible with the ML Image classifier data source, the classifier 501 is initialized with the data source, a URL of the directory that contains the data. FIG. 6 shows two folders, one named Training Data 503, and the other Testing Data 502. Each folder is organized with subfolders that have been labeled with the name of the category Harassing 504 and Neutral 505. The images are located in the appropriate subfolders for each data category. No duplicate images are allowed in the data source.

Then, the ML Vision classifier model 58 is uploaded to the user mobile device to predict the content of received images in the user social media content.

Video Classifier Model (59)

For incoming data in video format, features of the video content are extracted. One of the first steps is to detect the area of focus against the background. The current frame is compared to the background to detect people and extract features. The video classifier processes the video content to separate harassing data from neutral data (You et al., 2017). YouTube-8M Segments dataset is an extension of the YouTube-8M dataset with human-verified segment annotations. In addition to having the videos annotated, the entities in the videos are temporally localized. YouTube-8M is a large-scale labeled video dataset that comprises of millions of YouTube video IDs, with high-quality machine-generated annotations from a diverse vocabulary of 3,800+ visual entities. It comes with precomputed audio-visual features from billions of frames and audio segments. See Appendix, p.42. For devices with the iOS operating system, the Core ML video classifier runs with the Apple Vision framework to recognize, track objects, categorize, and filter out harassing videos. For Android devices, AutoML Video Intelligence Classification enables the training of machine learning models to classify shots and segments of video data according to labels. These models track objects in video data according to labels (harassment and neutral). See Appendix, p.48. The data is presented to the video classifier in the same way as shown in FIG. 6. Instead of having images in the folder, folder content of videos. Multiple Python ML vision libraries, including but not limited to TensorFlow and Kera video classifier models, run on any operating system.

Audio Classifier Model (60)

Similarly, for incoming audio content, features of the audio are extracted and the audio data are processed through an audio classifier to filter out harassment (Nam et al., 2016). A model that extracts the audio part of the video comprises the VGGish model. The VGGish uses the same architecture as the VGG model and replaces the input image with an audio spectrogram (Hershey et al., 2017). Audio clips are input to a different audio classifier to filter out unwanted content. One classifier is trained with intonation clips while another is trained with audio clips that emphasize content. In parallel, the content of the audio is grabbed with an audio to text converter. The text is then fed to a text classifier to filter out unwanted content. The results of the three classifiers are analyzed to determine if unwanted content is present. For devices using the iOS operating system, a sound classifier (e.g., Apple Sound classifier with Sound Analysis framework) categorizes the data. To perform effectively, the model is trained with the awareness of the ambient noise of the environment. In addition, speech recognition and voice analytics provide additional tools for the audio classifier model. The sound classification used by the Core ML model is using the SoundAnalysis and AVKit frameworks. See Appendix, p.60. The incoming audio content has its features extracted. The data is presented to the audio classifier in the same way as shown in FIG. 6. Instead of having images in the folder, the folder content comprises of audio clips. The audio classifier model 60 is uploaded on the mobile device to process real-time audio data to filter out harassment.

Text Classifier Model for Fake News (57)

We define fake news as false information that can be verified as not true. In order to train text classifiers 57 to detect fake and real news, a sizeable data set is needed for purposes of training the model. Each item of the set is labeled as "fake" or "real." The data set is gathered by scraping data from lists that contain different web sites that are known for posting unwanted content, such as the list provided by https://mediabiasfactcheck.com, a Media Bias/Fact Check website and the Washington Post fact-checking website. See Appendix, p.74. Additional fact-checking websites are listed on compilations provided by Wikipedia. See Appendix, p.76. Phys.org quoted Professor Ulrich Schade of the Fraunhofer Institute for Communication, Information Processing and Ergonomics FKIE on the difficulty involved: "Fake news items are often hosted on websites designed to mimic the web presence of news agencies and can be difficult to distinguish from the genuine sites." See Appendix, p.96. The data are processed to extract the characteristics of what renders the content fake. With the fact extraction characteristics and with the labeled data we build a knowledge base with content labeled as "fake" or "real." The decision-making process of the classifier is based on language by providing insights into the language used by fake news. The text classifier model is trained with the labeled data. Once the model is uploaded on the device, the incoming data are processed by the text classifier model trained to detect fake news in order to let the user know whether the content received is valid.

Video Classifier Model for Deepfake Video Detection (59)

Deepfake is used to create malicious hoaxes, fake news, or revenge pornography. Deepfake is a technique to combine and superimpose images to create new content. The current Deepfake algorithm can only generate images of limited resolutions, which need to be further warped to match the original faces in the source video. Such transforms leave distinctive artifacts in the resulting Deepfake videos. We use a classifier to detect Deepfake, Face Swap, and Lip Sync from audio. Lip Sync from audio files results when audio files of speech are blended with the head of a person different from the one who is talking. See Appendix, p.99.

5.1.e Labeled Text Data

The system uses lots of labeled data to train the ML text classifier in order to have a well-performing model. The labeled data are gathered internally and externally.

External Text Labeled Data

To detect harassment in content, the system uses two labels for text data: "harassment" and "neutral." If the external data to be used is labeled by the external source in more than two categories, then the system will combine them into only two categories. For instance, if the external source uses three categories labeled "abuse," "neutral" and "positive," then those three are merged into two categories: "harassment" and "neutral." The "neutral" label will now include the formerly labeled "neutral" and "positive" sets. The system uses the following sources of labeled text data.

Six different available datasets were merged to create a general and comprehensive input dataset by leveraging their annotation schemes into a binary "harassment" and "neutral" classification.

- NAACL_SRW_2016.csv (Waseem et al., 2016), "Hateful Symbols or Hateful People? Predictive Features for Hate Speech Detection on Twitter." A corpus of more than 16 k tweets, annotated with labels such as Racism, Sexism, and Neither. The labels conveying harassing content were changed into "harassment" and the neutral data kept as is.
- OnlineHarassmentDataset.csv (Golbeck et al., 2017), "A Large Labeled Corpus for Online Harassment Research." A corpus of 35,000 tweets, with 15% positive harassment examples and 85% negative examples.
- BullyingV3.0.zip (Xu, 2012), "Learning from bullying traces in social media." 7321 tweets with tweet ID, bullying, author role, teasing, type, form, and emotion labels that were all converted into "harassment" tweets.

http://research.cs.wisc.edu/bullying web site provides 7,321 annotated tweets in total.

Twitter-hate-speech-classifier-DFE-a845520.csv from data.world created on Nov. 21, 2016, by @crowdflowerdata.

Labeled_data.csv (Waseem et al., 2017), "Understanding Abuse: A Typology of Abusive Language Detection Subtasks."

Internal Text Labeled Data

The system collects labeled English text data internally in two different ways:

The Program Collecting Harassing Data 112 uses the standard search Twitter API to obtain tweets with specific harassment terms unknown to the model.

By using the bag-of-words adaptive filter 301 and retraining the text classifier with content yet unknown to the model.

The Italian data were gathered and labeled with a similar program that collects data with search Twitter API.

5.1.f Bag-of-Words

The bag-of-words content comprises of data from different sources. One source is the file "hatebase_dict.csv," provided by Hatebase, an online database of hate speech. The other source is the master thesis in computing sciences, "Automatic Detection of Cyberbullying on Social Media," by Love Engman. The bag-of-words is divided but not limited into five sets: the hardcore abusive set; the set of unpleasant terms; one set of double meaning terms; one set "bad action" and "target"; and the emojis. The first three sets are available in Appendix, p.130.

5.1.g Validation of Labeled Data and Bag-of-Words

To assess the quality of the training data, the same bag-of-words is used as a feedback loop to retrain the models during the deployment. At first, only one bag-of-words set of harassing words was used. During validation, this was extended to at least five different sets. The number of sets may increase depending on the data needs.

Labeled data are evaluated against the content of the bag-of-words set to check whether the different harassing terms were present or not in the tweets. If any hate-related term is found in tweets labeled as neutral, the label is changed to harassment. On the other hand, if no terms were found in tweets labeled as harassment, it is relabeled as neutral. Following this method, 1880 labels were changed from neutral to harassing. The size of the combined five bag-of-words sets needs to be reduced since the code is running on a mobile device and run time is essential. Reducing the lexicon set will consume less (CPU) power on the device since searching a huge set increases the CPU consumption. Additional Natural Language Procession (NLP) tools are being developed such as a lemma program that reduces different spellings of the same word to one word.

5.1.h ML Text Classifier Training & Testing

Text classifiers Apple Core ML and the AutoML text classifiers have been trained to recognize a pattern in the text, such as sentiments expressed in a sentence. FIG. 7 describes how Core ML provides several fundamental NLP building blocks 601 such as language identification 602, tokenization 603, part of speech tagging 604, lemmatization 605, and named entity recognition 606. These functionalities are provided across multiple languages.

Most NLP functionalities can be broken down into two broad categories of tasks:

Text classification: The objective in text classification—the text can either be a sentence, a paragraph, or a document—is to assign labels to this piece of text, and these labels can be sentiment labels, topic labels, or any type of labels.

Word tagging: Given a sequence of words or tokens, the objective is to assign a label to every token in the sequence.

Core ML has APIs in both text classification as well as word tagging. The sentiment analysis API is in seven different languages: English, French, Italian, German, Spanish, Portuguese, and simplified Chinese. The model learns to associate characteristics of the input text with labels. See Appendix, p.134.

FIG. 8 shows different types of classification algorithms that are run: logistic regression 654, nearest neighbor classifier 656, Support Vector Machines (SVM) 652, boosted decision trees 655, random forests 653, and any additional ones if needed.

The Max Entropy (MaxEnt) 651 algorithm evaluates and decides which classification algorithms will train the data. The MaxEnt is based on the Principle of Maximum Entropy and from all the models that fit the training data, it selects the one which has the largest entropy. The MaxEnt classifier is used to solve a large variety of text classification problems such as topic classification, sentiment analysis, and more. MaxEnt provides a framework for integrating information for classification from different algorithms.

The MaxEnt uses the training data to set constraints on the conditional distribution. Each constraint expresses a characteristic of the training data that should also be present in the learned distribution. MaxEnt performs well with dependent features. Internally, MaxEnt runs different sets of classification algorithms on a subset of the training data and uses a smaller subset of the training data (which becomes the validation set of the training set) to evaluate its own algorithm.

For Core ML and AutoML classifiers, no tuning of parameters and hyperparameters is required, as it is done automatically. The hyperparameters are the variables that orchestrate the training process itself: the setup of the neural network; how many hidden layers between the input layer and output layer; and how many nodes each layer should have.

Apple Core ML Text Classifier Training & Testing (FIG. 9)

FIG. 9 illustrates the English input data comprising of 78,533 inputs 701 with 33% (25,655) labeled as harassing content and 67% (52,878) labeled as neutral content. The 78,533 inputs are split randomly with 80% of the data going toward the training set 702 and 20% toward the testing set 703, with a seed of 5. The data are parsed randomly in 0.101028 seconds into the two sets. First, the data are cleaned by removing all the duplicate inputs and changing upper case characters to lower case characters. The data are put into a structure but limited to a MLDataTable, which is a machine learning version of a spreadsheet in which each row represents an entity; in this case, a tweet, and the first column in the table is the text of the tweet and the second column the label. The MLDataTable is an Apple Core ML structure that loads and processes large amounts of text in a tabular data format. The structure is designed to allow for the significant inputs of data that are required while performing machine learning.

Training:

The ML text classifier is initiated with the training data comprising of data content and a label for the specific content, either neutral or harassment. The model tokenizes the data and extracts its features. During the training, a classifier such as the MLTextClassifier puts aside a small percentage of the training data to use for validating the model's progress during the training phase. The total data set of 78,533 labeled tweets is divided into two sets: one consisting of 62,640 items 702 and the testing set 703 of 15,893 items. ML text classifier 310 puts aside 12,767 inputs out of the 62,640 inputs 702, to create a validation set 704 and the remaining 49,873 inputs become the training set 709. The validation set allows the training process to gauge the model's performance on examples the model hasn't been trained on. The evaluation accuracy describes how many examples are correctly labeled divided by the total number of examples. Depending on the validation accuracy, the training algorithm could adjust values within the model or even stop the training process when accuracy is deemed sufficient. After 25 to 29 iterations of training with the training data set 709, the text classifier model 57 acquires an accuracy 705 of 99.34% on the validation data. This level of accuracy was reached in 4.36 seconds.

Testing:

After acquiring training data accuracy of 99.35%, the model performance was evaluated on the test data consisting of 15,893 inputs 703 that were set aside before the training.

The evaluation accuracy on the test data was 90.36%. The classification error is the fraction of incorrectly labeled data over total data. The classifier error on the test data is 9.64%. The evaluation accuracy and the classification error are useful metrics only when the data is well-balanced between categories.

Our English data set is not balanced with 33% harassment versus 67% neutral. The ratio of harassing tweets on the Twitter app is much smaller than 33%, around 3% to 11%. Tables 1 and 2 reflect how imbalance affects the results.

Table 2 percentages are calculated from the values set forth in Table 1. To calculate the first row of Table 2 (Precision Recall Table), we define the following:

True Positive (TP): when the harassment content is labeled "harassment."

True Negative (TN): when the neutral content is labeled "neutral."

False Negative (FN): when neutral content is labeled "harassment."

False Positive (FP): when harassment content is labeled "neutral."

See Appendix, p.145 for Tables 1, 2, and 3.

TABLE 1

Confusion matrix - Core ML - English Results

| True | Predict | |
|---|---|---|
| | Harassment | Neutral |
| Harassment | 4,309 (TP) | 727 (FP) |
| Neutral | 805 (FN) | 10,052 (TN) |

TABLE 2

Precision and Recall - Core ML - English Results

| Class | Precision | Recall |
|---|---|---|
| Harassment | 84.26% | 85.56% |
| Neutral | 93.26% | 92.59% |

TABLE 3

F1 Score - Core ML - English Results

| Class | Harassment | Neutral |
|---|---|---|
| F1 | 84.90% | 92.92% |

$$Precision = \frac{|TP|}{|TP|+|FP|}$$

$$Recall = \frac{|TP|}{|TP|+|FN|}$$

$$F1 = 2 * \frac{precision * recall}{precision + recall}$$

To calculate the second row of Table 2, we follow the same approach as in the first-row calculation, only this time TP reflects when the neutral content is labeled "neutral." Similarly, TN reflects the content labeled "harassment." FP and FN are re-assigned accordingly.

Precision is the percentage of harassment detected compared to the total number of harassments. The recall is the percentage of harassment detected compared to the total number of items correctly detected either as harassment or as neutral.

Precision and recall on the harassment set reflect more accurately how the model is performing on the harassment set and the neutral set. The test data evaluation accuracy of 90.36% 706 reflects the overall performance of the model on the entire set. In Table 2, the 84.26% and 85.56% precision and recall percentages reflect how the model is performing on the harassing data. The 93.26% and 92.59% precision and recall percentages reflect how the model is performing on the neutral set.

F1 Score is the weighted average of the Precision and Recall. Therefore this score takes both false positives and false negatives into account. (See Table 3.)

The Italian input data consists of 199,020 inputs 701 with 50% labeled as harassing content and 50% labeled as neutral content. The Italian training data consists of 127,177 inputs 702. The 25 ML classifier iterations create a model with an accuracy of 98.12% on the training data. The ML classifier training using MaxEnt is completed in 11.84 seconds. The validation set of 31,959 inputs 704 evaluates the ML classifier training and at the final iteration, an accuracy of 98.12% is obtained. The testing data consist of 39,884 inputs 703; Table 5, based on the Table 4 data, shows that 89.38% precision and 87.07% recall were obtained for the harassing content.

See Appendix, p.148 for Tables 4, 5, and 6.

TABLE 4

Confusion matrix - Core ML - Italian Results

| True\ | Predict | |
|---|---|---|
| | Harassment | Neutral |
| Harassment | 16,984 (TP) | 2,523 (FP) |
| Neutral | 2,018 (FN) | 18,359 (TN) |

TABLE 5

Precision and Recall - Core ML - Italian Results

| Class | Precision | Recall |
|---|---|---|
| Harassment | 89.38% | 87.07% |
| Neutral | 87.92% | 90.10% |

TABLE 6

F1 Score - Core ML - Italian Results

| Class | Harassment | Neutral |
|---|---|---|
| F1 | 88.21% | 89.00% |

The Italian data set is more balanced with half harassment content and half neutral content. The precision and the recall percentage results between harassing content and neutral content are closer in range than for the English data set which is not a well-balanced set. Table 6 reflects the well balanced Italian data.

AutoML Text Classifier Training & Testing (FIG. 9)

Google Cloud Natural Language API provides content classification; sentiment detection; and extracts entities and syntax analysis. AutoML Natural Language features custom entity extraction and custom sentiment analysis. The training set 702 consists of 62,575 English tweets with 20,433 labeled as "harassment" and 42.142 labeled as "neutral". The testing set 703 consists of 7,822 labeled tweets of which 2,554 are labeled as "harassment" and 5,268 as "neutral". (See Tables 7 and 8)

See Appendix, p.151 for Tables 7 and 8.

TABLE 7

Confusion matrix - AutoML - English Results

| True | Predict | |
|---|---|---|
| | Harassment | Neutral |
| Harassment | 87% | 13% |
| Neutral | 2% | 98% |

TABLE 8

Precision and Recall - AutoML - English Results

| Class | Precision | Recall |
|---|---|---|
| Harassment | 95.44% | 86.88% |
| Neutral | 93.91% | 97.99% |

The Italian data training set 702 consists of 99,938 inputs. The Auto ML Text classifier is still a beta version and the maximum input data that its structure can take is 100,000 inputs. The Italian data set exceeds the maximum so it was reduced to half. The Italian testing set 703 consists of 9,994 inputs. (See Tables 9 and 10)

See Appendix, p.154 for Tables 9 and 10.

TABLE 9

Confusion matrix - AutoML - Italian Results

| True | Predict | |
|---|---|---|
| | Harassment | Neutral |
| Harassment | 95% | 5% |
| Neutral | 12% | 88% |

TABLE 10

Precision and Recall - AutoML - Italian Results

| Class | Precision | Recall |
|---|---|---|
| Harassment | 89.42% | 95.04% |
| Neutral | 94.47% | 88.30% |

The evaluation accuracy results we obtain with Core ML and Auto ML with the English and Italian data sets are in the same range. Table 11 reflects the good results obtained with an evaluation accuracy ranging from 88.61% to 94.36%. (See Tables 9 and 10)

TABLE 11

Evaluation Accuracy

| Evaluation accuracy | English | Italian |
|---|---|---|
| Core ML | 90.36% | 88.61% |
| Auto ML | 94.36% | 91.74% |

5.1.1 Real-Time Results

Further testing employing real-time data are conducted to test the accuracy of the model. Previously English-language trained models are uploaded with the Model Testing application on the device. From a list of user names previously gathered, the Model Testing application accesses their tweets, in real-time, and evaluates them with the trained model. The user name list is created from different sources. The list of user names contains names from people with diverse backgrounds. These selected users are not the individuals who wrote the tweets from the labeled data. The list is uploaded with the Model Testing application. On the device, tweets from the list of names are displayed. The tweets (which are the real-time data) are unknown to the Model, the bag-of-words and our development team. As a result, our deployment testing set comprises of random tweets from the user names list. The neutral tweets are displayed; TabBar allows the harassing content to be accessed. The Model Testing application is a way to evaluate how text classifier is filtering out harassment on real-time data content.

A search for U.S. Congresswoman Maxine Waters on Twitter shows that she receives a lot of harassing tweets. The names of harassing individuals were collected and added to the user name list. Appendix pages 157 and 158 are screenshots of the Model Testing application with TabBar harassment checked. On the device screen, we have harassing tweets displayed. Appendix page 159 displays the neutral tweet content with the TabBar set to Tweet. Results output were collected in debug mode with a print console function. On the device, 1890 tweets were displayed and the accuracy was 94%. The accuracy of our models varies with the type of tweets searched. The accuracy is lower for harassing tweets than for neutral ones. The margin of error in the accuracy is large given the need to integrate the modification found with the validation step into the deployment step.

5.1.j Report

When the classifier models 57, 58, 59, 60 detect harassment on the incoming data content 56, the harassment 62 and all the information about the senders and the receivers involved are sent to the server 105. FIG. 2 describes how a report 107 is sent to the system after the classifier models running on the server or the user device have detected harassment. The report contains the received harassing tweets and several components such as location, friends, and followers of the senders and of the receiver; this allows the harassment history of the senders to be better understood and recorded.

The report analyzes how the harassment spreads, what the harassment topics are and the sentiments associated with them, the emotional connection feature of the harassment (e.g., sexual), points of view, and geography (location of harasser; is he/she close by?). The report is sent to the appropriate responder 113 to solve the harassment issue depending on the intensity and the type of content. Reports are also sent to the corresponding social media company from where the content was derived and requests the removal of the content from the platform. Follow-up checks are done to see what action was taken by the social media company. Reports and analyses are stored to provide additional information on future reports. The report and any follow-ups will be sent to the users to inform them of the extent of the harassment threat.

The system generates a recommended action to address the conduct presented in the report. The urgency of the situation is taken into consideration. Outreach is done by asking, at the user's election, for professional intervention from social services, the education system, the judicial system, mental health providers, health providers, police, parents, and others in order to help root out harassment and its consequences. The offensive senders are blocked from sending additional content to the user.

The above information is stored in any graph database including but not limited to Neo4j to visualize the spread of the harassing tweets among users. The graph database stores report data comprising the following elements: sender I.D. and user name; tweet content and I.D.; receiver I.D. and user name; and retweet status. The graph is composed of nodes. Each node is either a sender or a receiver. On the graph, only the sender and receiver I.D. are displayed. The transaction between the nodes is characterized by the tweet I.Ds. Other tables associate the tweet I.D. to the tweet content; sender I.D. with the sender user name; receiver I.D. with the receiver user name. The tweet I.D. is unique and it was created by Twitter while the sender and receiver I.D. are created internally. The historical information collected provides additional input parameters to reinforce the classifier model training.

5.1.j Improving the Prediction Result (FIGS. 10A, 10B)

FIG. 10A shows a text classifier 809 training with Tabular data 801. The table comprises a group of rows and columns to store training parameters. The columns comprise: tweet content 802, Auto ML results 803; Core Mt results 804; any bag-of-words terms contained in the tweet 805; the intensity of the harassing history of the sender 806; the intensity of the harassing history of the sender's friends and followers 807; tweet label 808. Each row of the table represents a tweet content with each associated column element for that row. The text classifier 806 creates a model 57-*e*.

FIG. 10B shows that to improve and evaluate the results of text classifiers, including but not limited to Core ML 57-*a* and AutoML 57-*b* models on the incoming data 56, we compare the results 851. If the results from both classifiers are the same, the content data is added to the corresponding set 852. Harassing content is added to the harassing set. If the results from both classifiers differ 853, then the text classifiers model 57-*c* is run on the input parameters 854 comprising: the tweet content; Core ML result; Auto ML result; Bag-of-words terms if any is content in the tweet; the intensity of the harassing history of the sender, the sender's friends and followers. Depending on the result, the tweet content is tagged with the appropriate label either harassing or neutral 855, 5.2 System—Outgoing Data (FIG. 11)

FIG. 14 shows the transfer of the outgoing data between the device 108 and social media platforms 104 and is similar to the transfer of incoming data shown in FIG. 2. However, the ML classifier or process is not applied to the outgoing data. When the user composes a tweet, it is sent with no alteration.

5.3 Customized ML Models (FIGS. 12, 13)

Text classifiers train customized ML models such as a Customized Core ML model. FIG. 12 shows a smaller amount of labeled customer data 901 to train a model in conjunction with prior knowledge of the language word embeddings model 902 that provides a great deal of knowledge of the language. It is called Transfer Learning which is a highly active research area in NLP. The training of the new model relies on previous trained model knowledge.

ML classifier 903 trains the model with the data 901 and any word embedding model such as Word Embedding Core ML model 902; the outcome is a transfer learning text classification model such as Transfer Learning Text Classification model Core ML model 57-*d*.

One of the purposes of embedding is to give different values for words depending on their meaning and context. Ordinary word embedding just maps words to vectors, and it will give the same value for the word no matter how it appears. The dynamic embedding changes the value of the embedding for words depending on their sentence context, which is a very powerful technique for doing Transfer Learning for Text Classification. See Appendix, p.134.

FIG. 13 shows how customized ML classifier models 65 apply to incoming data on mobile devices 108 and on the server 105. No ML classifier models are applied to the sender content. The classifiers are tuned to the user's definition of what is harassing or not.

An on-device training of the model allows the model to be trained with user specific data such as the likes and user tweets; as well as for each instance that the user relabeled received tweets. A look-up table for words and phrases such as Gazetteer Apple is specific to the user language style. A word embedding dictionary of words and their embedding vectors such as the MLWordEmbedding model from Apple is also specific to the user data.

The embodiments discussed herein are illustrative of the present invention. As these embodiments of the present invention are described with reference to illustrations, various modifications or adaptations of the methods and/or specific structures described may become apparent to those skilled in the art. For example, the bag-of-words is currently divided into five sets, but it is understood that the content and division and subdivision may be modified to accommodate new data. Another example is the report that might evolve with input from different groups such as social platforms, school systems, LGBT groups, and more.

All such modifications, adaptations, or variations that rely upon teachings of the present invention, and through which these teachings have advanced the art, are considered to be within the scope of the present invention. For example, a text catalog such as Gazetteer from Core ML for compressing data to obtain a smaller bag-of-words. With the latest developments in Machine Learning comprising Core ML and Auto ML, new functionalities are provided that are expected to be incorporated into the system to fine-tune the accuracy.

What is claimed is:

1. A method filtering incoming social media data with a system comprising:
    transferring data from at least one social media platform to at least one user device and at least one server;
    labeling social media data content with a characteristic term that represents the content;
    validating training data sets against bag-of-words sets;
    training and evaluating classifier models with the labeled data;
    implementing a user application that runs the models;
    running the user application on a user mobile device;
    detecting the language of the data content;
    uploading the classifier models associated with the detected language onto the user device;
    filtering out unwanted incoming social media content with classifier models on a server or a mobile device;
    separating neutral content from unwanted content;
    displaying neutral content while the unwanted content is still accessible with a
    clickable or a sliding area, including but not limited to a tab;
    customizing models for the user preferences;
    reporting the unwanted content to entities that might are able to intervene on the user's behalf;
    wherein the classifier models that filter out unwanted content is comprised of text classifier models that filter incoming text data in multiple language; image classifier models that filter incoming image data; audio classifier models that filter incoming audio data; video classifier models that filter incoming video data;
    wherein a text classifier is trained with the following input parameters comprising:
    the tweet content;
    any bag-of-words terms contained in the tweet;
    the intensity of the harassing history of the sender;
    the intensity of the harassing history of the sender's friends;
    the intensity of the harassing history of the sender's followers; results from different types of text classifier model;
    tweet label.

2. The method of claim 1, wherein a model was created to evaluate data content when results from two different text classifier models differ from each other after the same data content has been input.

* * * * *